US012536291B2

(12) United States Patent
Suryanarayana et al.

(10) Patent No.: US 12,536,291 B2
(45) Date of Patent: Jan. 27, 2026

(54) PLATFORM BOOT PATH FAULT DETECTION ISOLATION AND REMEDIATION PROTOCOL

(71) Applicant: Dell Products L.P., Round Rock, TX (US)

(72) Inventors: Shekar Babu Suryanarayana, Bangalore (IN); Yasaswi Saisriram Bhimaraju, Ongole (IN)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 18/364,680

(22) Filed: Aug. 3, 2023

(65) Prior Publication Data

US 2025/0045403 A1 Feb. 6, 2025

(51) Int. Cl.
*G06F 21/57* (2013.01)
*G06F 9/4401* (2018.01)
*G06F 11/3604* (2025.01)

(52) U.S. Cl.
CPC .......... *G06F 21/572* (2013.01); *G06F 9/4411* (2013.01); *G06F 11/3612* (2013.01)

(58) Field of Classification Search
CPC ... G06F 21/572; G06F 9/4411; G06F 11/3612
See application file for complete search history.

(56) References Cited

U.S. PATENT DOCUMENTS

| | | | | |
|---|---|---|---|---|
| 7,698,547 | B1 * | 4/2010 | Polyudov | G06F 9/44521 713/2 |
| 9,542,195 | B1 * | 1/2017 | Astarabadi | G06F 11/1469 |
| 2011/0060945 | A1 * | 3/2011 | Leprince | G06F 11/2294 713/1 |
| 2016/0180094 | A1 * | 6/2016 | Dasar | G06F 9/4406 714/36 |
| 2017/0199776 | A1 * | 7/2017 | Dasar | G06F 11/079 |
| 2019/0286436 | A1 * | 9/2019 | Liu | G06F 8/654 |
| 2020/0210203 | A1 * | 7/2020 | Madala | G06F 8/65 |
| 2020/0372156 | A1 * | 11/2020 | Sayyed | G06F 21/577 |
| 2021/0311747 | A1 * | 10/2021 | Liao | H04L 67/1095 |
| 2023/0064398 | A1 * | 3/2023 | Samuel | G06F 11/0784 |

\* cited by examiner

*Primary Examiner* — Thomas C Lee
(74) *Attorney, Agent, or Firm* — Jackson Walker L.L.P.

(57) ABSTRACT

A disclosed method monitors boot path driver events to identify faulty boot path drivers in a UEFI-compliant boot path. Upon identifying a faulty boot path driver, the faulty driver is isolated and a corresponding remediation driver is fetched. An override driver dispatch list is created by modifying an original driver dispatch list to replace the faulty driver with the remediation driver, wherein the remediation driver occupies the same place in the execution order of the override driver dispatch list as the faulty driver occupies in the original driver dispatch list. Following a warm reset, a boot path load is performed in accordance with the override driver dispatch list, thereby remediating the boot path without performing a firmware update on a serial peripheral interface (SPI) flash device or the like. In this manner, a faulty driver is detected, isolated, and remediated in a single boot path.

20 Claims, 7 Drawing Sheets

PLATFORM BOOT PATH FAULT DETECTION ISOLATION AND REMEDIATION PROTOCOL

TECHNICAL FIELD

The present disclosure pertains to information handling systems and, more specifically, management of firmware updates in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include and rely on firmware to enable low-level control of platform-specific hardware. Firmware may be developed and maintained by silicon device vendors and other third party software developers. Firmware may be revised from time to time to fix bugs, add new features, or for other reasons. Installing revised firmware on a deployed system is commonly referred to as a firmware update process. At least in part because firmware is generally stored in nonvolatile storage, firmware update processes generally require device-specific configuration and instructions to perform erase and write operations. Accordingly, although firmware updates are inevitable and generally beneficial, end user customers may view firmware update processes as formalized and time consuming and, therefore, may generally prefer fewer updates to more frequent.

SUMMARY

Disclosed subject matter addresses, at least in part, an inability to resolve preboot failures by means other than conventional firmware update processes in which a firmware storage device, such as a nonvolatile memory (NVM) of the platform is erased and/or programmed or otherwise written. Disclosed embodiments implement and support a firmware update override procedure that boots a platform operating system (OS), after detecting a faulty driver during preboot, without performing a firmware update. Instead, disclosed subject matter performs an override operation to load a remediation driver from an update payload in an update boot path, thereby avoiding NVM erase and write operations while still successfully booting the platform. Additionally, embodiments may load configuration bitmaps to support platform configuration changes and device settings associated with most critical updates from silicon vendors and other third parties.

In at least one embodiment, the detection of a faulty module triggers the loading of a corresponding remediation module to enable the system to boot an OS without updating firmware flash or other NVM. Embodiments may override a driver dispatch list in a load module boot path with a new driver order to boot the OS and reload the remediation module at runtime to avoid memory map without multiple reboots. Embodiments may also generate one or more bitmaps for platform configuration and/or device settings without further platform reboot. Some embodiments may employ a signed remediation nonvolatile memory express (NVMe) namespace for remediation module updates and dynamic load in boot path.

Accordingly, in one aspect, disclosed information handling systems and methods monitor boot path driver events to identify one or more faulty boot path drivers. In embodiments employing unified extensible firmware interface (UEFI)-compliant boot paths, boot path driver events may be monitored from the pre-EFI initialization (PEI) phase to the preboot execution environment (PXE) or boot device selection (BDS) phase. Upon identifying a faulty boot path driver, the faulty driver is isolated and a corresponding remediation driver is fetched. An override driver dispatch list is created by modifying an original driver dispatch list to replace the faulty driver with the remediation driver, wherein the remediation driver occupies the same place in the execution order of the override driver dispatch list as the faulty driver occupies in the original driver dispatch list. Following a warm reset, a boot path load is performed in accordance with the override driver dispatch list, thereby remediating the boot path without performing a firmware update on a serial peripheral interface (SPI) flash device or the like. In this manner, a faulty driver is detected, isolated, and remediated in a single boot path.

In at least some embodiments, the remediation drivers are provided in a basic input/output system (BIOS) update, e.g., via a cryptographically signed BIOS update module. The BIOS update may be detected while operating in an OS runtime environment. Upon receiving a BIOS update, modified drivers contained in the update are identified and added to a dynamic firmware volume (DFV), which is written to random-access memory (RAM). Writing the DFV to RAM may include writing the DFV to a discontiguous plurality of memory blocks in physical RAM, creating an information table indicative of start addresses for each of the plurality of memory blocks, loading the information table to physical RAM, and saving a start address of the information table to NVRAM. After the DFV information is stored, a warm reboot may be performed to initiate a boot path load that includes determining whether fault data indicative of one or more faulty drivers exists. If fault data indicates one or more faulty drivers, the information table start address may be retrieved and the start address information in the information table may be used to extract the DFV and store it below 4 GB address space in physical RAM. An override driver list identifying remediation drivers may then be created and used to override the one or more faulty drivers with corresponding remediation drivers. The DFV may be stored to NVM and, in at least some embodiments, within a globally unique identifier (GUID) partition table (GPT) within the NVM. The DFV may be written to the GPT, for example, if a BIOS update is detected following a cold boot. Before the next cold boot occurs, the DFV may be written from the RAM using an I/O memory management unit (IOMMU).

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
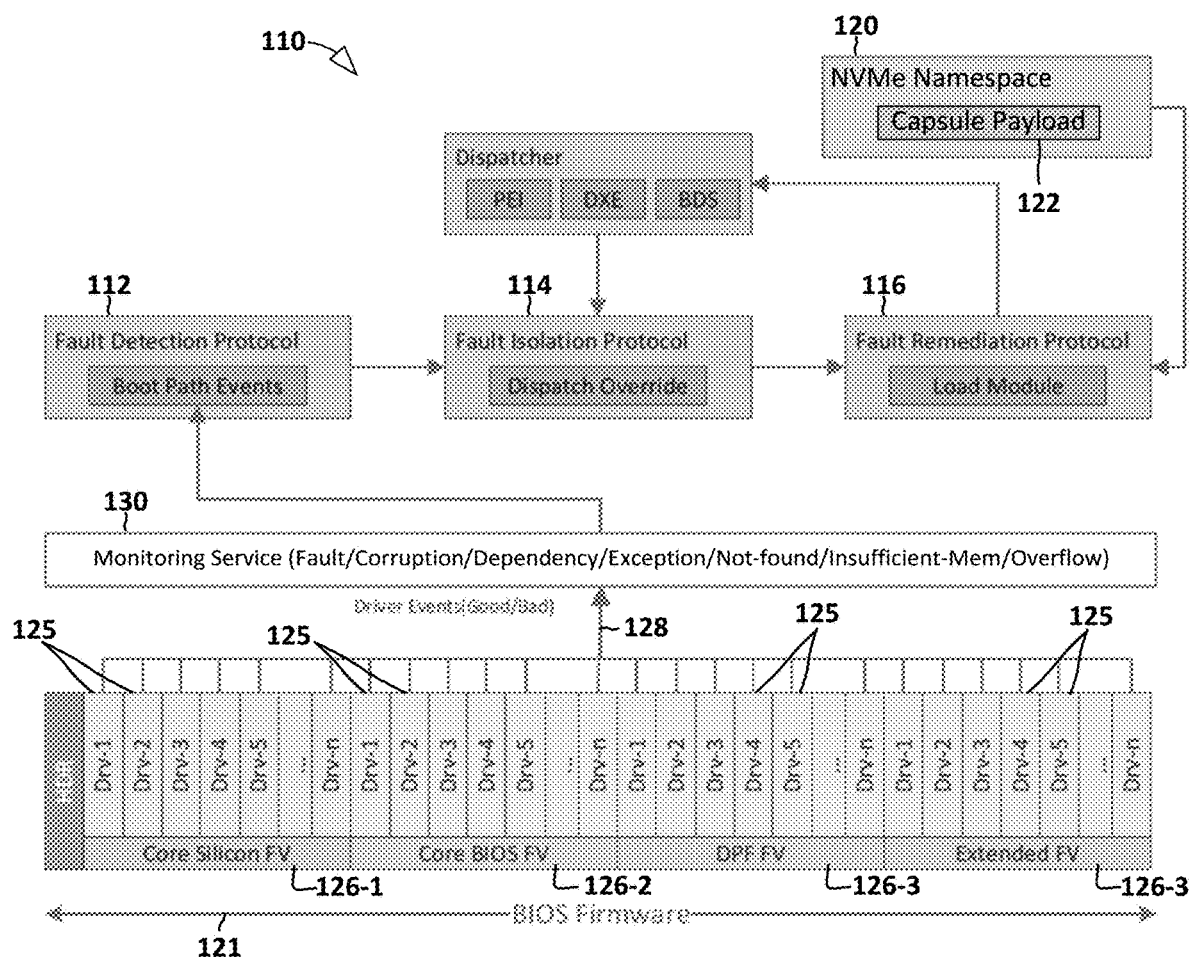
FIG. 1 illustrates a fault detection, isolation, and remediation protocol.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

FIG. 1 illustrates elements of a fault detection, isolation, and remediation (FDIR) protocol 110 suitable for use in conjunction with disclosed subject matter. The depicted FDIR protocol 110 includes a fault detection protocol 112 for dynamic detection of faulty boot path drivers, also referred to herein as boot path modules or, more simply, modules. In systems featuring at least one UEFI-compliant boot path, faulty modules may be monitored beginning at an early part of the PEI phase all the way through late driver execution environment (DXE) and boot device selection (BDS) phases. A fault isolation protocol 114 of FDIR protocol 110 isolates faulty drivers while a fault remediation protocol 116 remediates the faulty module by loading a remediation module, i.e., an operational module corresponding to a faulty module, from an NVMe namespace 120 to successfully boot a platform OS.

The FDIR protocol 110 illustrated in FIG. 1 implements a monitoring service 130 to monitor boot path driver events 128 generated by various drivers 125 associated with various firmware volumes 126 of BIOS firmware 121. Good vs faulty events 128, determined based on historical driver events, are recorded and processed to identify faulty drivers and boot path malfunctions.

The fault detection protocol 112 processes all reported events from monitoring service 130. Based on the boot execution error in the history and event type, fault detection protocol 112 detects faulty driver module(s). Once a faulty driver is identified, fault isolation protocol 114 isolates the dispatched driver execution in fault mode and locates a corresponding remediation driver from a capsule payload 122 in NVMe namespace 120. In addition, fault isolation protocol 114 may create an override list on top of an isolation list.

Fault remediation protocol 116 loads the remediation driver in the same execution order as the original dispatch list by re-iterating the load operation without consuming an additional reboot. In this manner, a driver fault may be detected, isolated and remediated in the same reboot path. For some driver types, e.g., microcode for chipset initialization, a reboot may be executed.

In at least some embodiments, the FDIR protocol 110 illustrated in FIG. 1 dynamically detects and remediates the boot path modules without actually performing a firmware update on SPI flash, which not only reduces wear on the flash device, but also enables faster and safe updates.

The capsule payload 122 passed from OS can be a Firmware Management Protocol (FMP) payload with a single module update or a complete BIOS payload. Based on the update type, FDIR protocol 110 may detect the faulty driver and isolate it from the boot path. Once isolation is performed, fault remediation protocol 116 is located from the firmware volume payload and a classification order is performed to dynamically update the dispatch list by reinitializing the memory.

The classified payload may be used to perform an update on a virtual device. The virtual device can reside in memory or in NVMe namespace 120, once the faulty driver's dispatch list order is isolated, the remediation driver from the virtual device is dispatched with an override list and dynamically remediates the faulty driver in the same boot path without any additional reboot.

Figure 2:
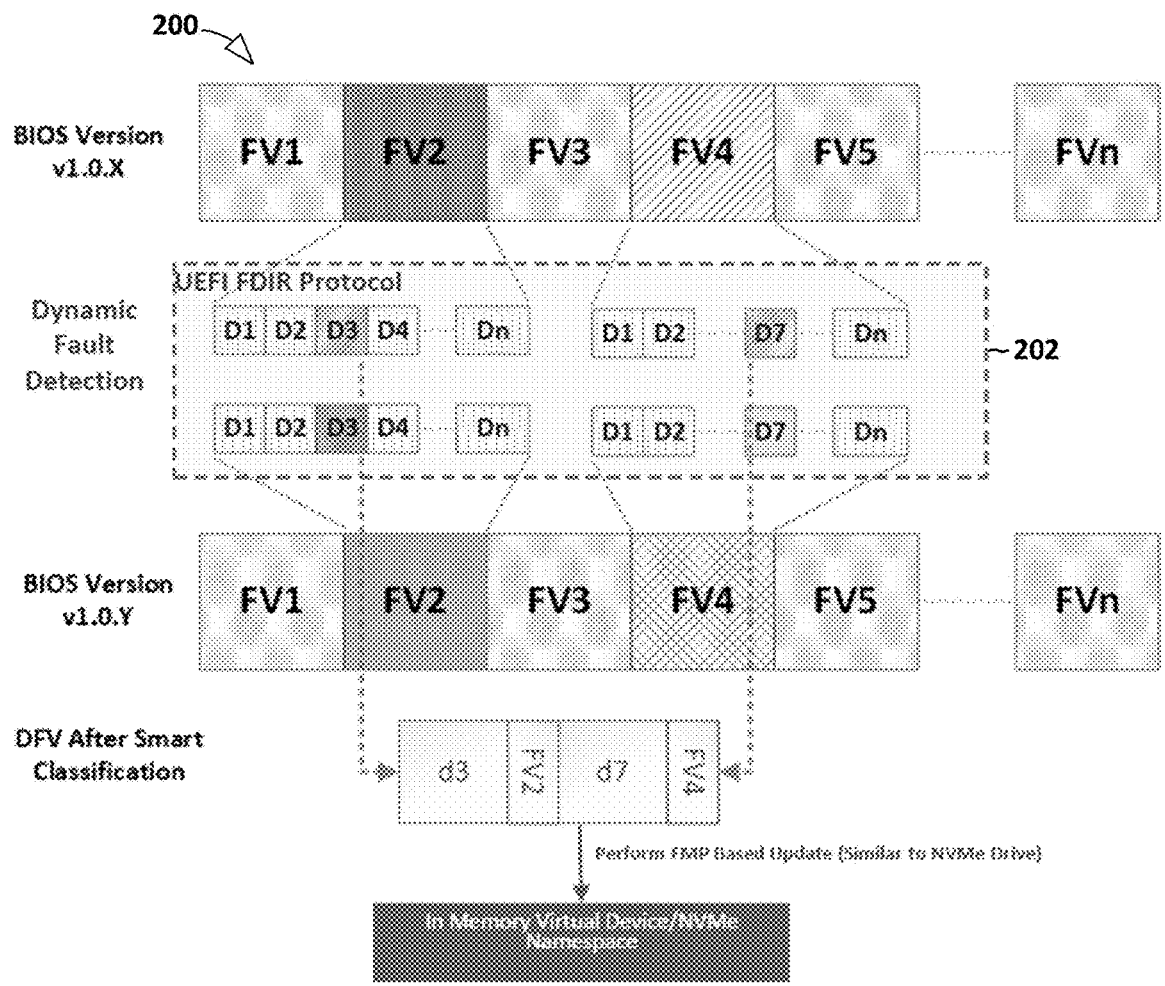
FIG. 2 illustrates dynamic update of a dispatch list.

Referring now to FIG. 2, a firmware update payload 200 passed from OS may comply with a firmware management protocol (FMP) payload and may include a single updated module or a complete BIOS payload. Based on the update type, the FDIR protocol detects (202) faulty driver(s) and isolates the faulty driver(s) from the boot path. Once the isolation is performed the remediation module is located from the firmware volume (FV) and classification order is performed to dynamically update an original driver dispatch list by reinitializing the memory, and the classified payload is used to perform an update on a virtual device. In FIG. 2, a module D3 in firmware volume 2 (FV2) and a module D7 in FV 4 are identified as faulty. After smart classification of remediation drivers for the faulty drivers, a dynamic firmware volume includes the remediation modules in the same fashion as an NVMe drive update is happening today. The virtual device can reside in memory or in NVMe namespace, and once the faulty driver's dispatch list order is isolated, the remediation driver from virtual device is dispatched with an override list and dynamically remediates the faulty driver in the same boot path without any additional reboot.

Figure 3:
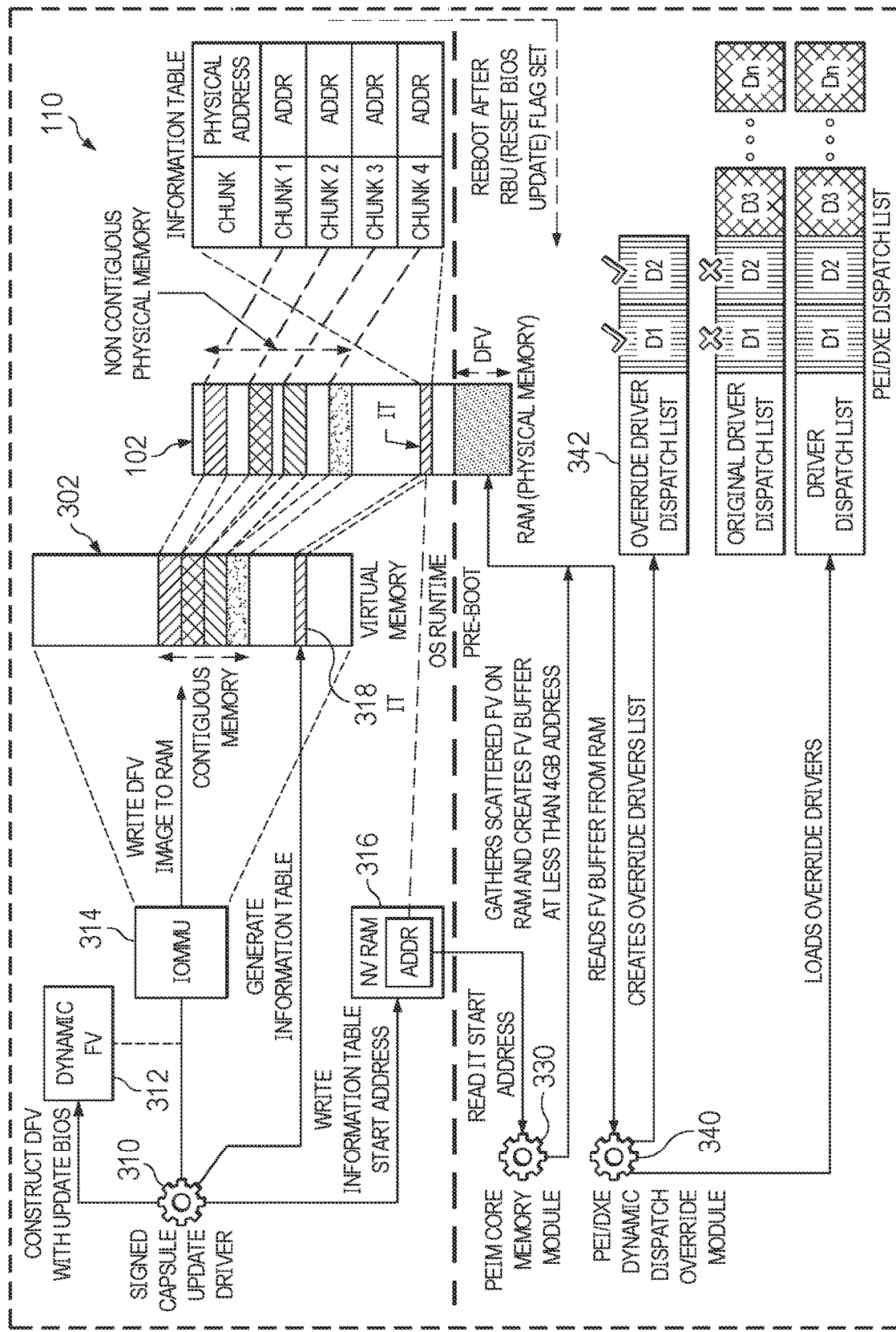
FIG. 3 illustrates an architecture of disclosed features for the detection, isolation, and remediation protocol.

Referring now to FIG. 3, a detailed architectural diagram of information handling system 100 illustrates components of a disclosed FDIR protocol 110. As depicted in FIG. 3, FDIR protocol 110 is implemented with a signed capsule update driver (SCUD) 310, a PEI core memory module 330, and a PEI/DXE dynamic dispatch override module 340.

The SCUD 310 illustrated in FIG. 3 is an OS space driver configured to look for BIOS updates. Upon receiving a BIOS update, SCUD 310 applies a smart classification process to the latest BIOS to identify modified drivers, i.e., drivers that differ from corresponding drivers currently implemented. The modified drivers identified by SCUD 310 are intelligently added to a dynamic firmware volume (DFV) 312. SCUD 310 loads DFV 312 to a contiguous block of virtual RAM space 302 via IOMMU 314. FIG. 3 further illustrates that the contiguous block of virtual RAM space containing DFV 312 corresponds to a plurality of discontiguous memory blocks within physical RAM 102. SCUD 310 may collect a physical RAM start address of each non-contiguous memory block associated with DFV 312 and create an information table 318 containing these addresses. Information table 318 may then be loaded to physical RAM 102 while the start address of information table 318 is stored in NVRAM 316.

SCUD 310 may include a fault detection module to detect faulty UEFI modules in both pre-boot and OS space using diagnosis. Fault data associated with the identified modules may then be saved in secure NVRAM space 316.

During a pre-boot state following a warm reboot, PEI Core Memory Module (PCMM) 330 may determine whether fault data, i.e., information indicative of a faulty boot path driver, exists and then fetch the information table start address data from NVRAM 316. After the address table start address is fetched, PCMM 330 may use a coalesce module to extract the DFV from the RAM and store it below 4 GB address space to be used by subsequent modules.

After DFV 312 is stored in RAM 102, PEI and DXE dynamic dispatch override module 340 may use the DFV 312 and create a list of overriding remediation drivers 342 and then override an original driver dispatch list to replace faulty drivers with their corresponding remediation drivers. In this manner, remediation of a faulty driver boot path is achieved without modifying SPI flash.

Figure 4:
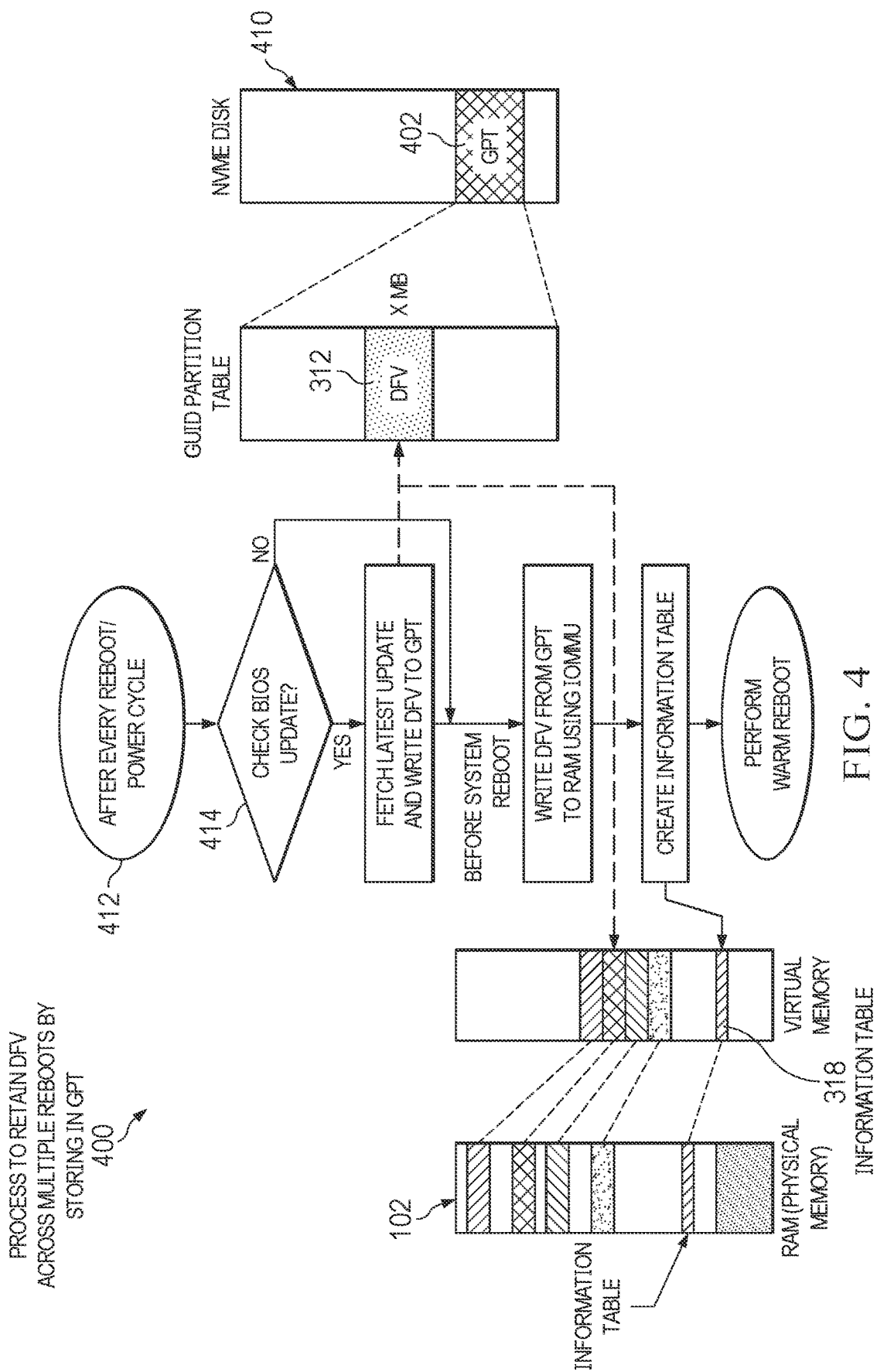
FIG. 4 illustrates storing a dynamic firmware volume in a GUID partition table.

FIG. 4 illustrates the storing 400 of DFV 312 within a GPT-protected partition 402 of NVMe 410 to enable access across multiple reboots. GPT-protected partition 402 will be used to store the DFV. Upon every reboot or power cycle (412), a signed capsule update driver will check (414) for a firmware update. If a firmware update is available, a smart classification method is performed to identify and extract DFV 312, which includes all modified drivers in the firmware update capsule, and then stores DFV 312 in the GPT protected partition 410.

Before the next system reboot or power cycle occurs, DFV 312 is written to RAM 101 for pre-boot accessing during the next warm boot. The start addresses of all the blocks may be fetched to create the information table 318 containing all of the start addresses. Information table 318 may be added to physical RAM 102 and stored as the physical start address of information table 318 into secure NVRAM along with a Hash of DFV 312. An analogous process will be used in preboot, within a PEI core module, to fetch the start address of information table 318 and gather all the non-contiguous blocks to generate DFV 312.

The illustrated solution implements a method to dynamically detect faulty modules in SPI flash and load the corresponding remediation module to boot to OS directly and avoid flash update. the illustrated solution may be performed by dispatching the updated drivers without writing it onto SPI memory.

As depicted in FIG. 4, the process 400 starts in OS Runtime to generate the DFV 312 and then ends in Pre-boot by dispatching the DFV 312.

In at least some embodiments, existing components modified for dispatching updated drivers without writing to SPI flash include the OS Runtime-Signed Capsule Update Driver and PEI core memory module, PEI/DXE Dynamic Dispatch Override Module, Fault detection module.

Storing DFV in RAM for easy access in pre-boot upon fault detection. At OS Runtime after getting the BIOS Update, Signed Capsule update driver will perform Smart classification method. This gets only the modified driver modules by using the existing BIOS image on platform and updated BIOS image. Updated driver modules will be constructed as Dynamic Firmware Volume (DFV). Same DFV will be stored in the GPT protected partition for further usage. Signed Capsule update driver will then push the DFV to RAM. In OS there will be Virtual memory stack controlled by IOMMU, So the DFV will be pushed to the Virtual memory controlled by IOMMU (Input Output Memory Map Unit). Using the IOMMU only fetch Physical RAM address and create Information Table (IT). Place the Information Table on VM and save the physical address of information table in NVRAM variable. Then perform warm reboot.

Loading remediation module instead of faulty driver to boot to OS directly by avoiding flash update. At Pre-boot when fault detection module finds fault data. PEI core memory module will fetch start address of Information Table (IT) from NVRAM variable. Using Information table fetches the multiple buffers from RAM and creates DFV and stores in RAM below 4 GB address. Same DFV will be used by PEI/DXE Dynamic Dispatch Override Modules to load remediation drivers without loading faulty drivers on SPI flash. After DFV buffer is written to physical RAM, PEI Dynamic Dispatch Override Module will construct the PEI dispatch list with remediation drivers instead of original faulty drivers in SPI. Loads all drivers from PEI list. After performing PEI phase, then DXE Dynamic Dispatch Override Module constructs DXE dispatch list with remediation drivers instead of original faulty drivers in SPI.

Figure 5:
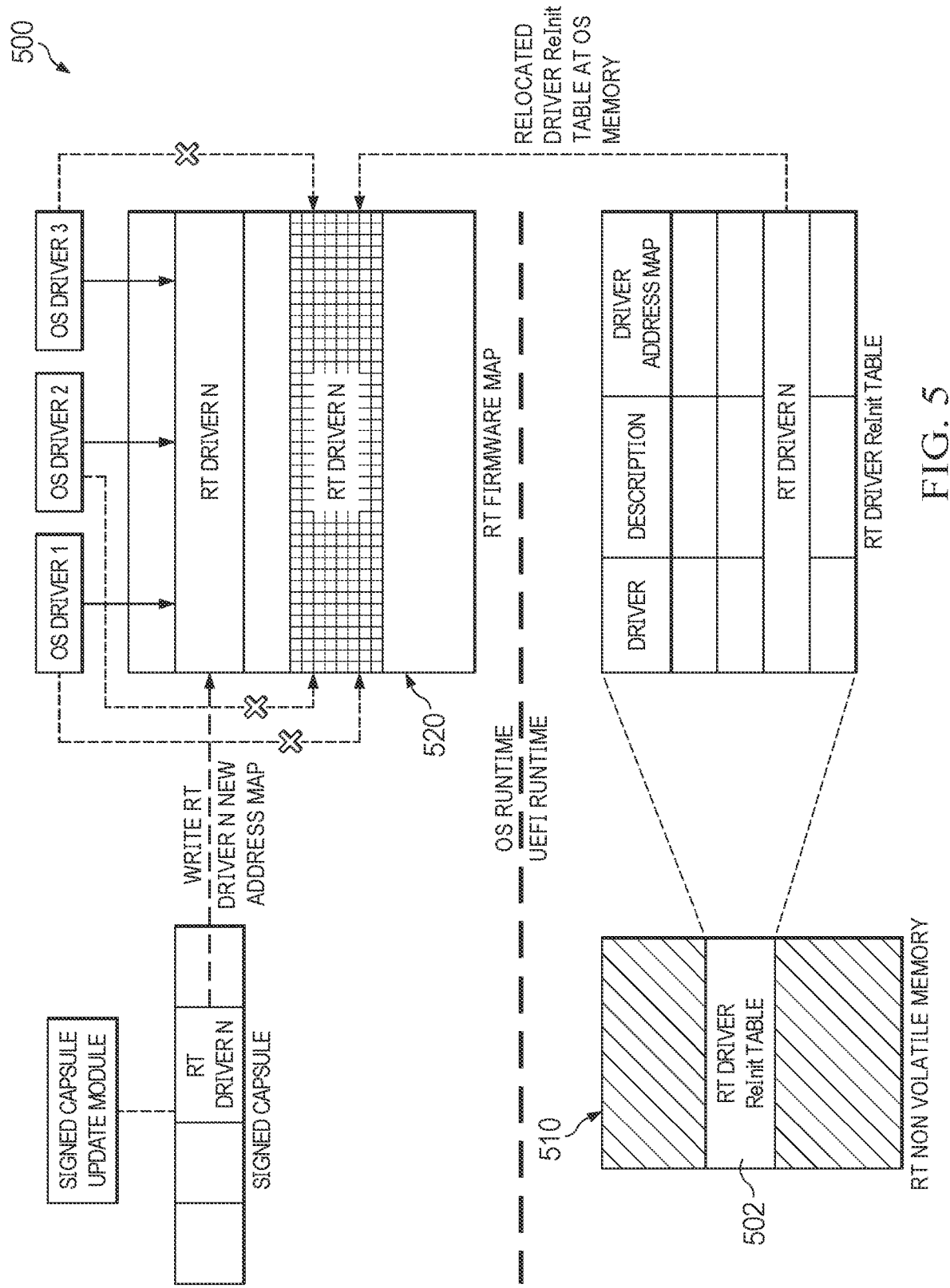
FIG. 5 illustrates updating driver configuration bitmaps to a runtime firmware map.

Firmware configuration map update and auto tuning. FIG. 5 illustrates updating 500 the driver configuration bitmap to the runtime firmware map.

In Pre-boot, RT Driver Re-Init Table (DRT) 502 will be created and placed in the RT Non-volatile memory 510. Same will be relocated in OS Runtime and creates a RT Firmware map 520. This DRT holds the Driver Address Map of all the Runtime drivers. When any RT driver causes an issue, the fault detection module diagnoses the driver and finds the specific driver causing the issue. This fault information is sent to the signed capsule update driver 310 for updating the driver configuration bitmap. Signed capsule update driver 310 will then extract the modified driver from the capsule and create the configuration bitmap dynamically in the RT Firmware map region and update the RT firmware configuration map to use the updated driver configuration bitmap. Once the configuration bitmap is updated, Drivers/Applications in OS space will use the new driver configuration map for further usage.

Figure 6:
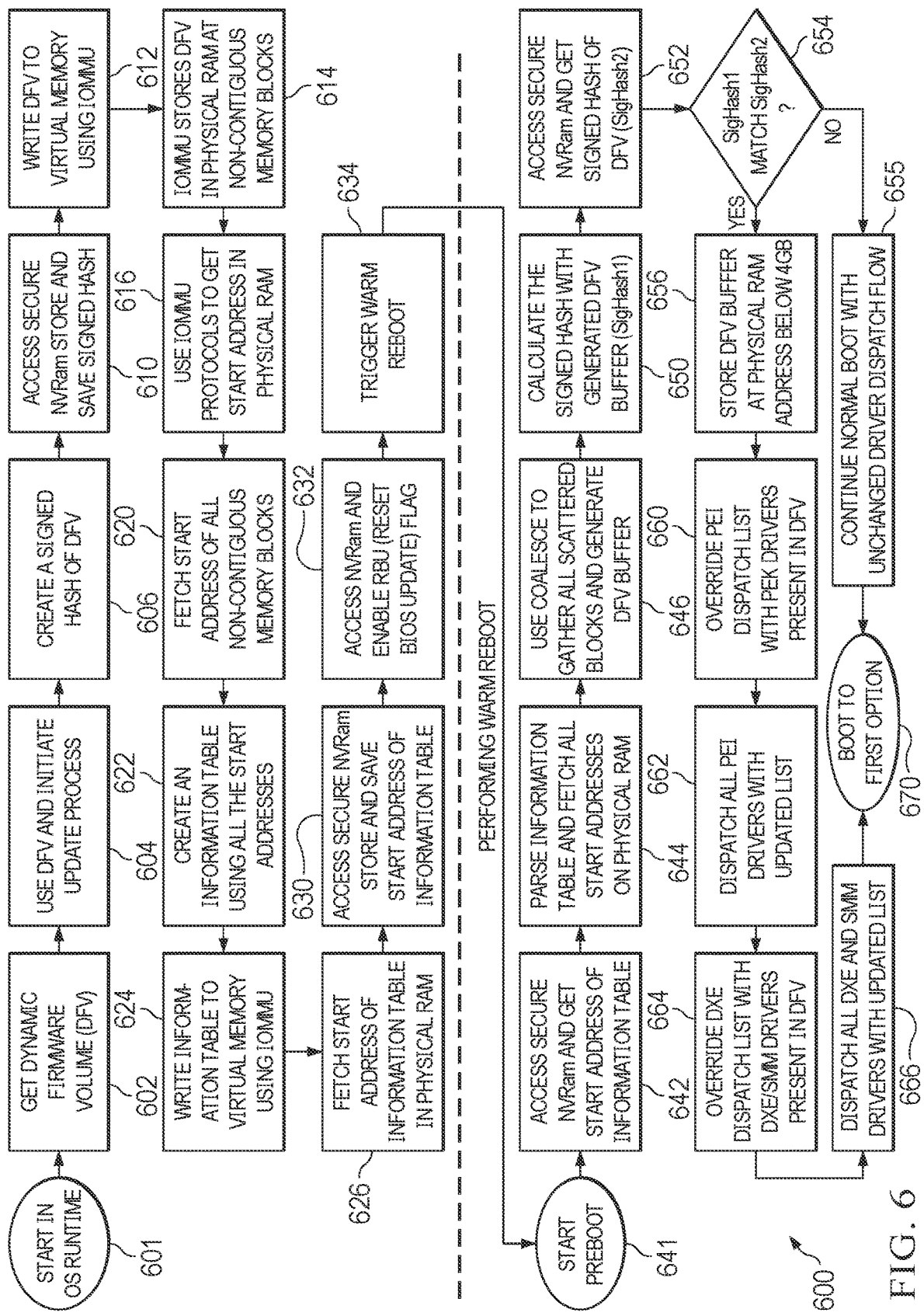
FIG. 6 illustrates a flow diagram of an end-to-end method.

FIG. 6 illustrates an end-to-end flow 600 of disclosed features for obtaining BIOS updates in OS runtime and dispatching updated drivers from a DFV in a subsequent UEFI pre-boot without writing to SPI flash. The flow 600 depicted in FIG. 6 begins (601) in an OS runtime by obtaining (602) a DFV and using the DFV to initiate (604) an update process. A signed hash of the DFV is created (606) and stored (610) to a secure NVRam store. The DFV is then written (612) to virtual memory via IOMMU. The IOMMU then stores (614) the DFV in discontiguous memory blocks. An IOMMU protocol is invoked (616) to determine start addresses of the physical RAM blocks and the start addresses of all of the discontiguous blocks are fetched (620) and used to create (622) an information table, which is then written (operation 624) to virtual memory by the IOMMU. The start address of the information table is fetched (626) from physical RAM and the secure NVRAM store is accessed (630) to save the information table start address. NVRAM is then accessed (632) to enable the rest BIOS update (RBU) flag before a warm boot is triggered (634) to initiate (641) a preboot sequence.

The preboot sequence begins by accessing (642) secure NVRAM to obtain the information table start address and parsing (644) the information table to fetch all physical RAM start addresses. A coalesce operation may be performed (646) to gather all scattered blocks and generate a DFV buffer (SigHash1). A signed hash (SigHash1) may then be calculated (650) based on the DFV buffer before accessing (652) secure NVRAM and obtaining a signed hash (SigHash2) of the DFV.

If SigHash1 and SigHash2 fail to match in decision block 654, the illustrated method 600 continues (655) with normal boot with unchanged driver dispatch flow and boots (670) to the first option. If SigHash1 and SigHash2 match, the DFV buffer is stored (656) at a physical RAM address below 4 GB and a PEI dispatch list is overridden (660) with PEI drivers present in the DFV. All PEI drivers may then be dispatched (662) with an updated driver list. A DXE dispatch list is then overridden (664) with DXE/system management mode (SMM) drivers present in the DFV before dispatching (666) all DXE & SMM drivers with the updated list and booting (670) to the first option.

Figure 7:
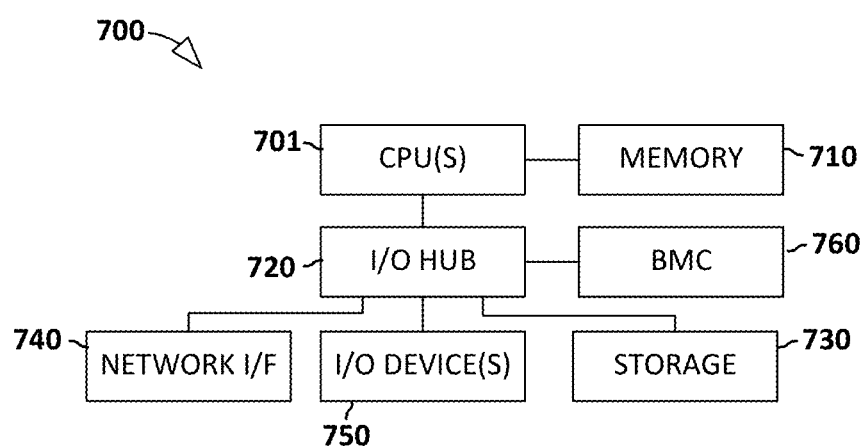
FIG. 7 illustrates an exemplary information handling system suitable for use in conjunction with the systems and methods described in FIGS. 1-6.

Referring now to FIG. 7, any one or more of the elements illustrated in FIG. 1 through FIG. 6 may be implemented as or within an information handling system exemplified by the information handling system 700 illustrated in FIG. 7. The illustrated information handling system includes one or more general purpose processors or central processing units (CPUs) 701 communicatively coupled to a memory resource 710 and to an input/output hub 720 to which various I/O resources and/or components are communicatively coupled. The I/O resources explicitly depicted in FIG. 7 include a network interface 740, commonly referred to as a NIC (network interface card), storage resources 730, and additional I/O devices, components, or resources 750 including as non-limiting examples, keyboards, mice, displays, printers, speakers, microphones, etc. The illustrated information handling system 700 includes a baseboard management controller (BMC) 760 providing, among other features and services, an out-of-band management resource which may be coupled to a management server (not depicted). In at least some embodiments, BMC 760 may manage information handling system 700 even when information handling system 700 is powered off or powered to a standby state. BMC 760 may include a processor, memory, an out-of-band network interface separate from and physically isolated from an in-band network interface of information handling system 700, and/or other embedded information handling resources. In certain embodiments, BMC 760 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
   monitoring boot path driver events and, responsive to identifying a faulty driver in a boot path of an information handling system:
   fetching a remediation driver corresponding to the faulty driver;
   creating an override driver dispatch list by modifying an original driver dispatch list to replace the faulty driver with the remediation driver; and
   performing a boot path load in accordance with the override driver dispatch list.

2. The method of claim 1, wherein the remediation driver is in the same execution order as the faulty driver in the original driver dispatch list.

3. The method of claim 1, wherein the monitoring of boot path driver events includes boot path driver events from a pre-EFI initialization (PEI) phase to a driver execution environment (DXE) phase of a unified extensible firmware interface (UEFI) boot.

4. The method of claim 1, further comprising, responsive to receiving a basic input/output system (BIOS) update:
   identifying modified drivers in the BIOS update;
   adding the modified drivers to a dynamic firmware volume (DFV); and
   writing the DFV to random-access memory (RAM).

5. The method of claim 4, wherein writing the DFV to RAM includes:
   writing the DFV to a discontiguous plurality of memory blocks in physical RAM;
   creating an information table indicative of start addresses for each of the plurality of memory blocks;
   loading the information table to physical RAM; and
   saving a start address of the information table to nonvolatile RAM (NVRAM).

6. The method of claim 5, further comprising:
   performing a warm reboot and determining whether fault data exists;
   responsive to identifying fault data indicating one or more faulty drivers, fetching the information table start address and using the start address information to extract the DFV and store it in the RAM below RAM physical address 4 GB;
   creating an override driver list identifying one or more remediation drivers; and
   overriding the one or more faulty drivers with the one or more remediation drivers.

7. The method of claim 4, further comprising:
   storing the DFV to a non-volatile memory (NVM).

8. The method of claim 7, wherein storing the DFV to the NVM comprises storing the DFV within a globally unique identifier (GUID) partition table (GPT) within the NVM.

9. The method of claim 8, further comprising:
   following a cold boot, responsive to detecting a BIOS update, writing the DFV to the GPT; and
   before a next cold boot occurs, writing the DFV from the GPT to the RAM.

10. The method of claim 9, wherein writing the DFV to the RAM comprises writing the DFV to the RAM by an input/output memory management unit (IOMMU) of the information handling system.

11. An information handling system, comprising:
    a central processing unit (CPU); and
    a system memory, accessible to the CPU, including processor-executable instructions that, when executed by the CPU, cause the information handling system to perform operations comprising:
    monitoring boot path driver events and, responsive to identifying a faulty driver in a boot path of an information handling system:
    fetching a remediation driver corresponding to the faulty driver;
    creating an override driver dispatch list by modifying an original driver dispatch list to replace the faulty driver with the remediation driver; and
    performing a boot path load in accordance with the override driver dispatch list.

12. The information handling system of claim 11, wherein the remediation driver is in the same execution order as the faulty driver in the original driver dispatch list.

13. The information handling system of claim 11, wherein the monitoring of boot path driver events includes boot path driver events from a pre-EFI initialization (PEI) phase to a driver execution environment (DXE) phase of a unified extensible firmware interface (UEFI) boot.

14. The information handling system of claim 11, wherein the operations include, responsive to receiving a basic input/output system (BIOS) update:
    identifying modified drivers in the BIOS update;
    adding the modified drivers to a dynamic firmware volume (DFV); and
    writing the DFV to random-access memory (RAM).

15. The information handling system of claim 14, wherein writing the DFV to RAM includes:
    writing the DFV to a discontiguous plurality of memory blocks in physical RAM;
    creating an information table indicative of start addresses for each of the plurality of memory blocks;
    loading the information table to physical RAM; and
    saving a start address of the information table to nonvolatile RAM (NVRAM).

16. The information handling system of claim 15, further comprising:
- performing a warm reboot and determining whether fault data exists;
- responsive to identifying fault data indicating one or more faulty drivers, fetching the information table start address and using the start address information to extract the DFV and store it in the RAM below RAM physical address 4 GB;
- creating an override driver list identifying remediation drivers; and
- overriding the override drivers.

17. The information handling system of claim 14, further comprising:
- storing the DFV to a non-volatile memory (NVM).

18. The information handling system of claim 17, wherein storing the DFV to the NVM comprises storing the DFV within a globally unique identifier (GUID) partition table (GPT) within the NVM.

19. The information handling system of claim 18, further comprising:
- following a cold boot, responsive to detecting a BIOS update, writing the DFV to the GPT; and
- before a next cold boot occurs, writing the DFV from the GPT to the RAM.

20. The information handling system of claim 19, wherein writing the DFV to the RAM comprises writing the DFV to the RAM by an input/output memory management unit (IOMMU) of the information handling system.

* * * * *